United States Patent

Kobrin

[11] Patent Number: 6,087,655
[45] Date of Patent: Jul. 11, 2000

[54] FIBER GRATING ENCODERS AND METHODS FOR FABRICATING THE SAME

[76] Inventor: Boris Kobrin, 186 Willow Pond Way, Penfield, N.Y. 14526

[21] Appl. No.: 09/081,286

[22] Filed: May 19, 1998

Related U.S. Application Data

[60] Provisional application No. 60/061,860, Oct. 15, 1997.

[51] Int. Cl.[7] .................................. H01J 3/14; F01D 5/34
[52] U.S. Cl. .................................. 250/237 G; 250/231.18
[58] Field of Search ........................ 250/231.18, 231.14, 250/231.13, 227.21, 237 G

[56] References Cited

U.S. PATENT DOCUMENTS

| | | | |
|---|---|---|---|
| 5,760,391 | 6/1998 | Narendran | 250/227.14 |
| 5,869,835 | 2/1999 | Udd | 250/227.18 |
| 5,892,582 | 4/1999 | Bao | 356/345 |

*Primary Examiner*—Edward P. Westin
*Assistant Examiner*—Glenn T Kinnear
*Attorney, Agent, or Firm*—Harter, Secrest & Emery LLP; Stephen B. Salai, Esq.; Brian B. Shaw, Esq.

[57] ABSTRACT

Very long linear large diameter rotational, and arbitrary shape conformal fiber encoders are suggested. These devices are based on detection of non-zeroth diffraction order or interference pattern of selected diffraction orders from the fiber grating. Relative and absolute position detection or movement detection can be realized. Depending on the variety of disclosed configurations of fiber encoders, fiber grating could be either a fiber Bragg grating (refractive index modulation grating), a fiber surface-relief phase grating, or fiber amplitude or amplitude phase grating. Each of these fiber gratings may have a uniform or chirped period, and the fiber grating encoders may be implemented using transmission, reflection, or Bragg angle reflection schemes. An optical fiber may be manufactured on a continuous basis by drawing it from preform. Consequently, there is really no limitation to the length of the linear fiber based encoders. In addition, since fiber grating can be mounted on a circularly symmetric figure of arbitrary diameter, there is therefore no limitation on the manufacturable size of a rotary encoder. Due to flexibility of fibers, the proposed gratings can be mounted on a surface of arbitrary shape, thereby enabling optical motion encoders to be fabricated for conformal surfaces. Some manufacturing techniques are disclosed.

46 Claims, 16 Drawing Sheets

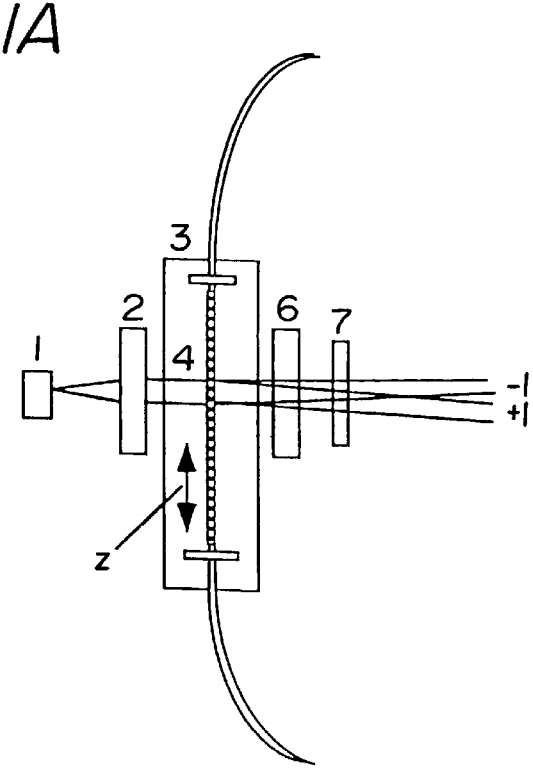
FIG. IA
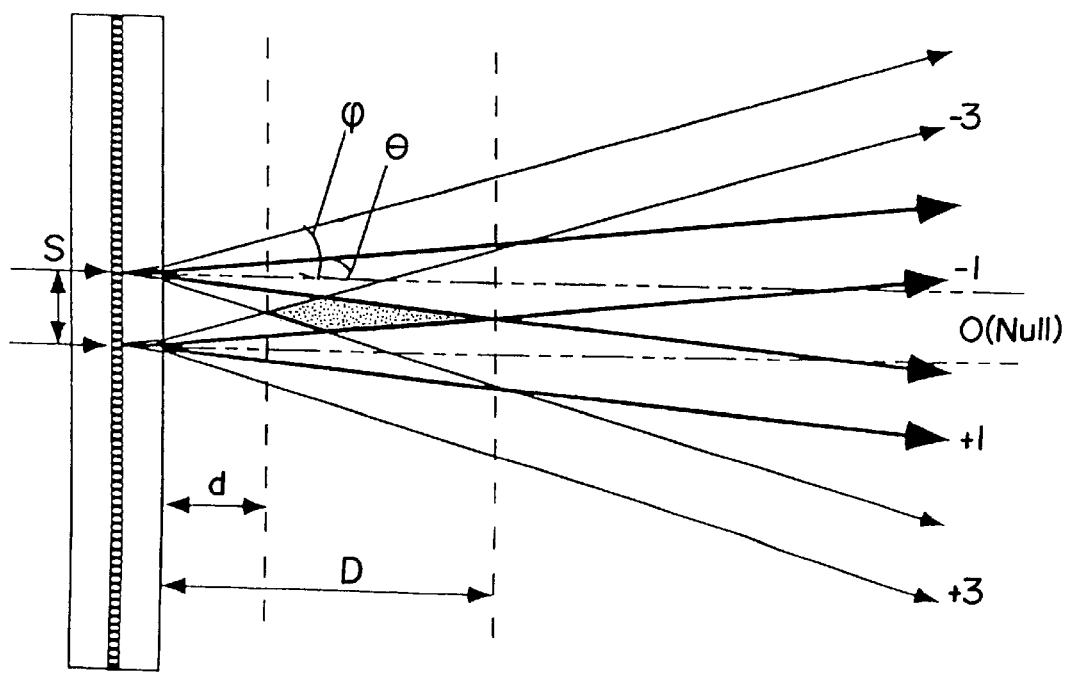
FIG. IB

FIG. 3A
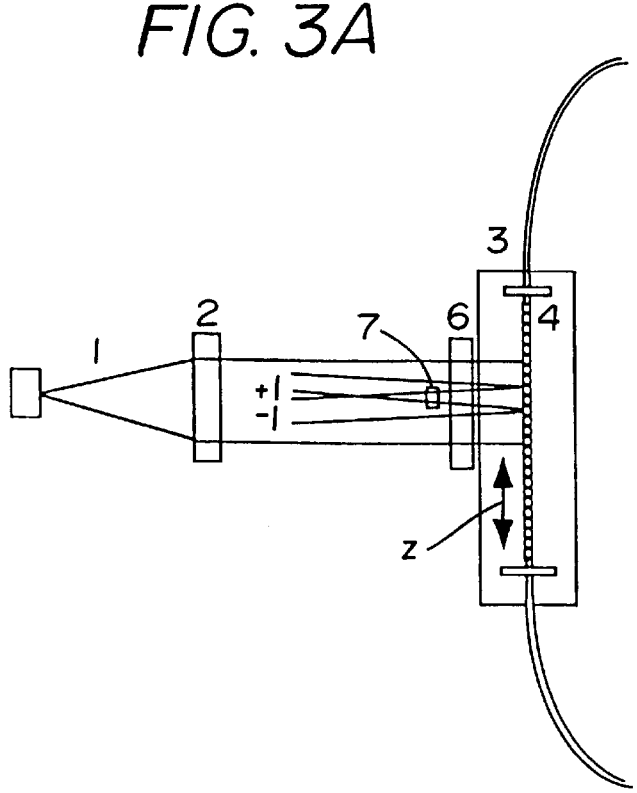
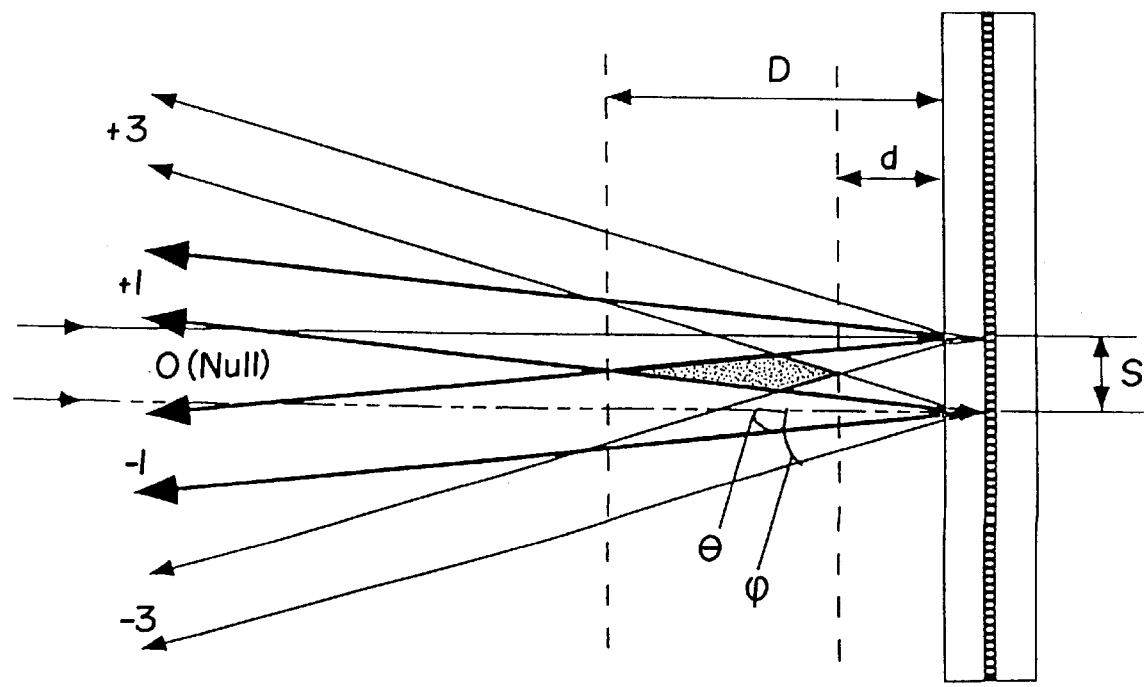
FIG. 3B

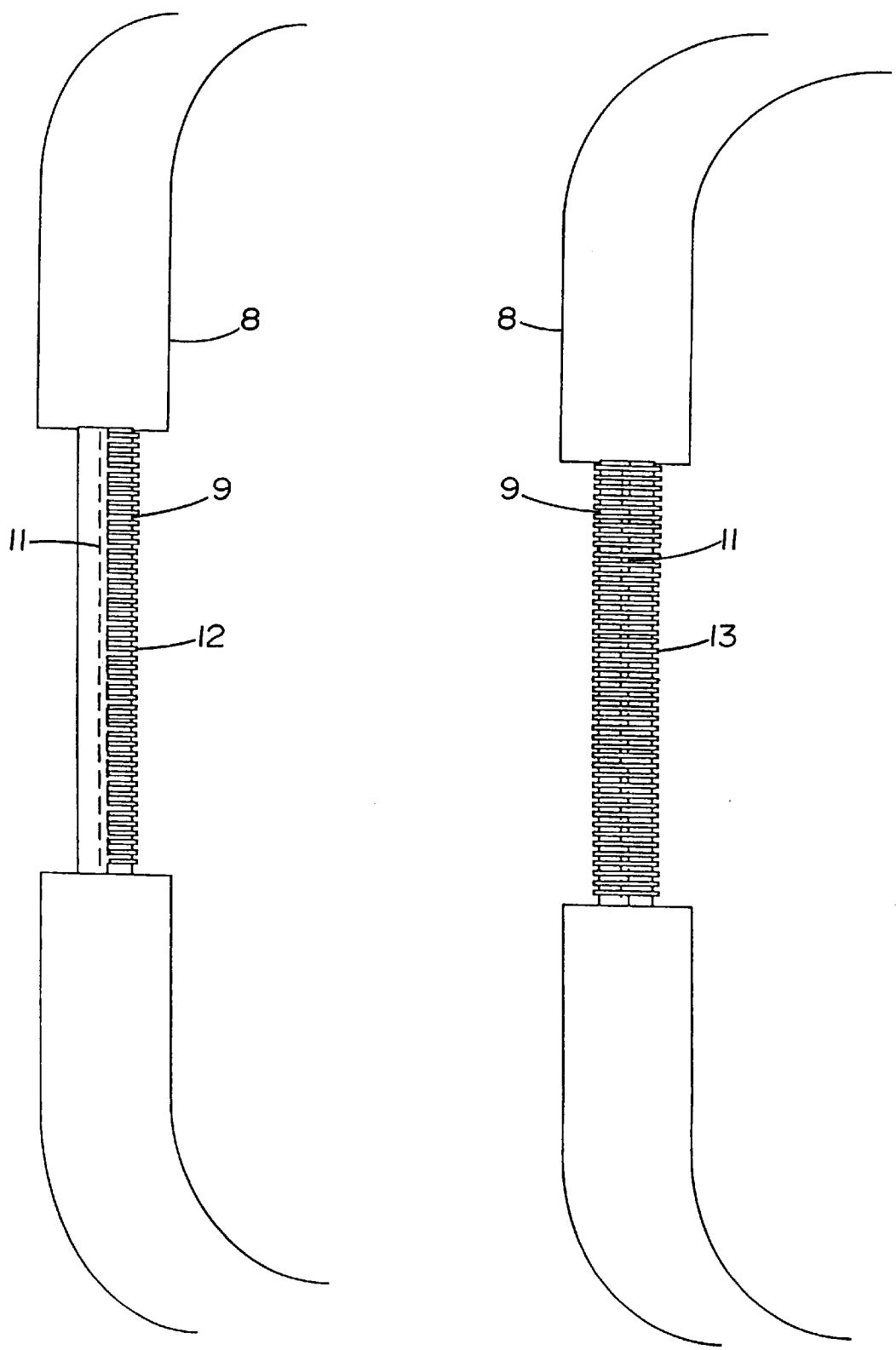

FIG. 7A
FIG. 7B
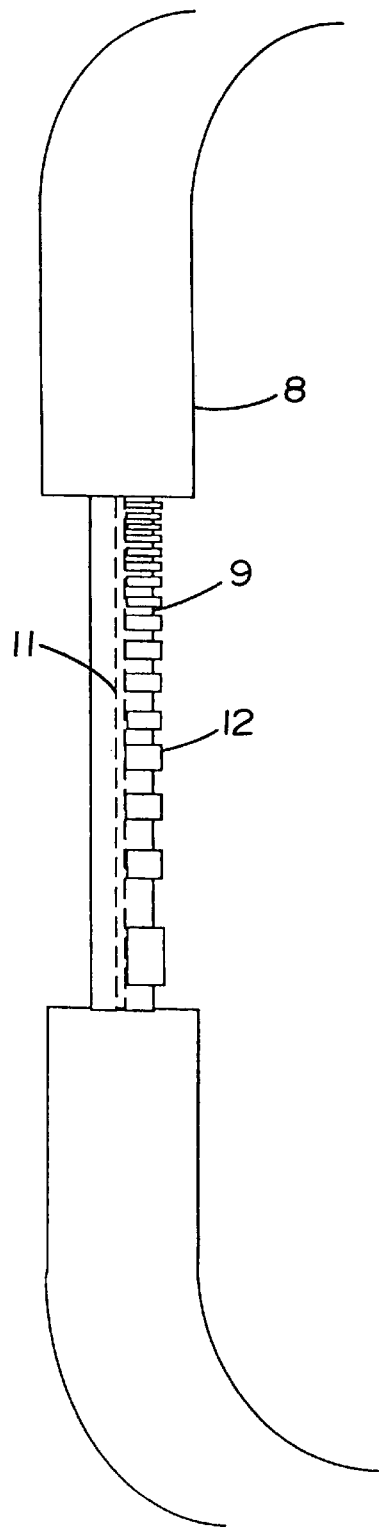
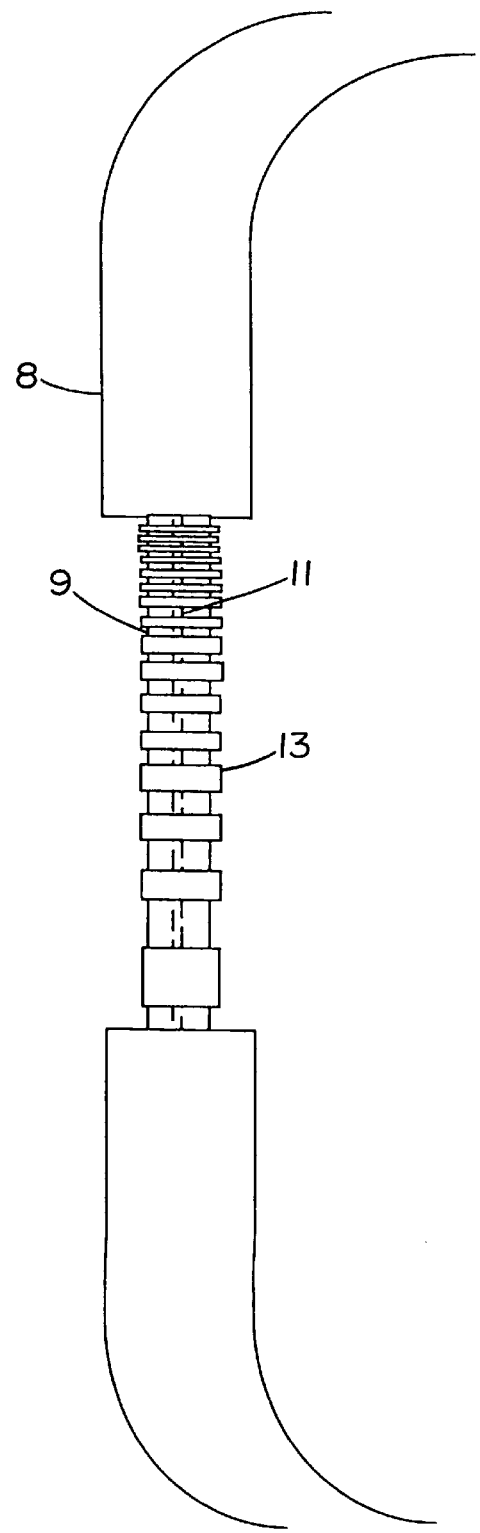

FIG. 8A
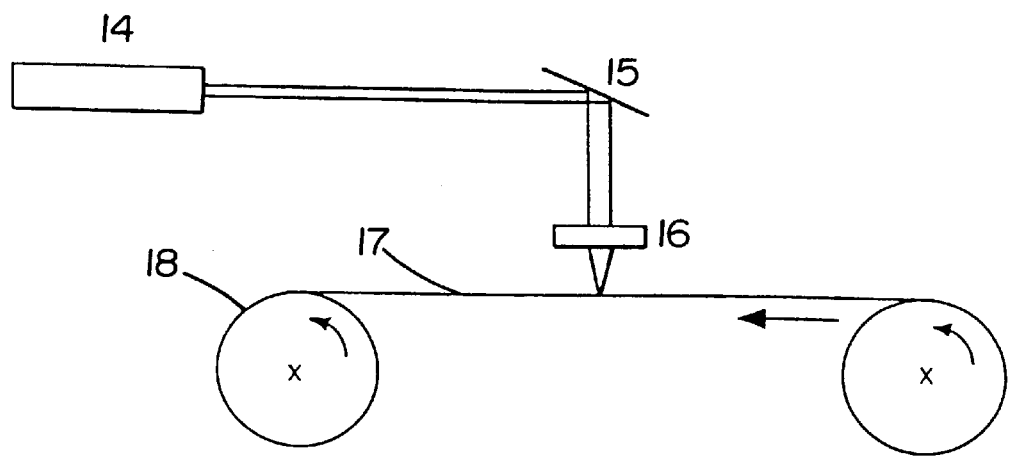
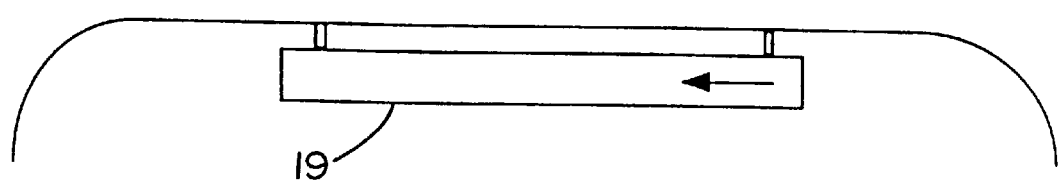
FIG. 8B

FIG.12A
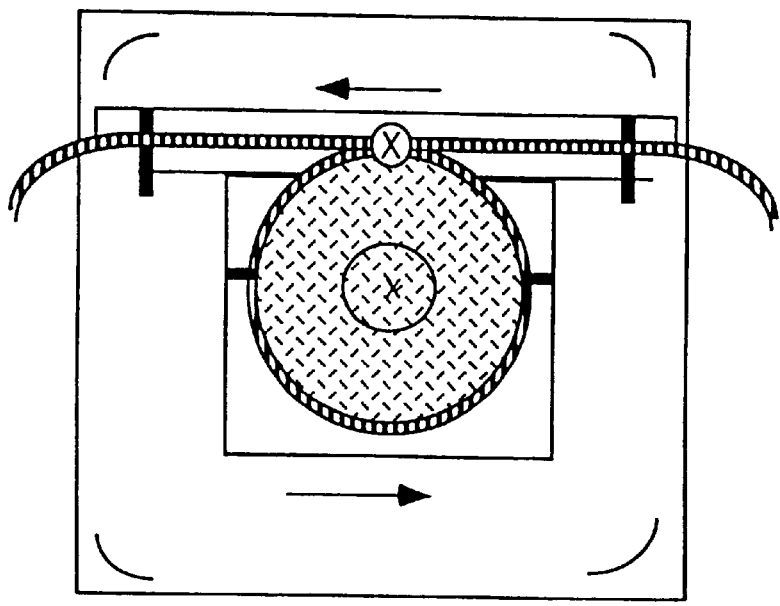
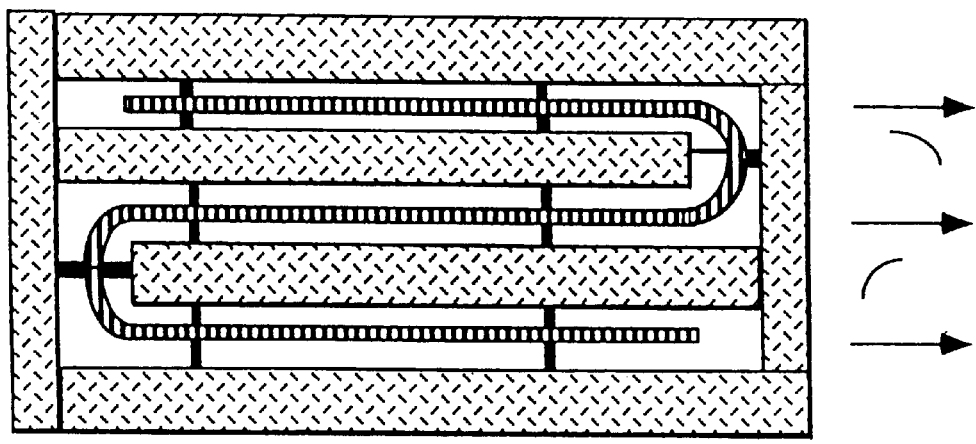
FIG. 12B

FIG. 13A
FIG. 13B
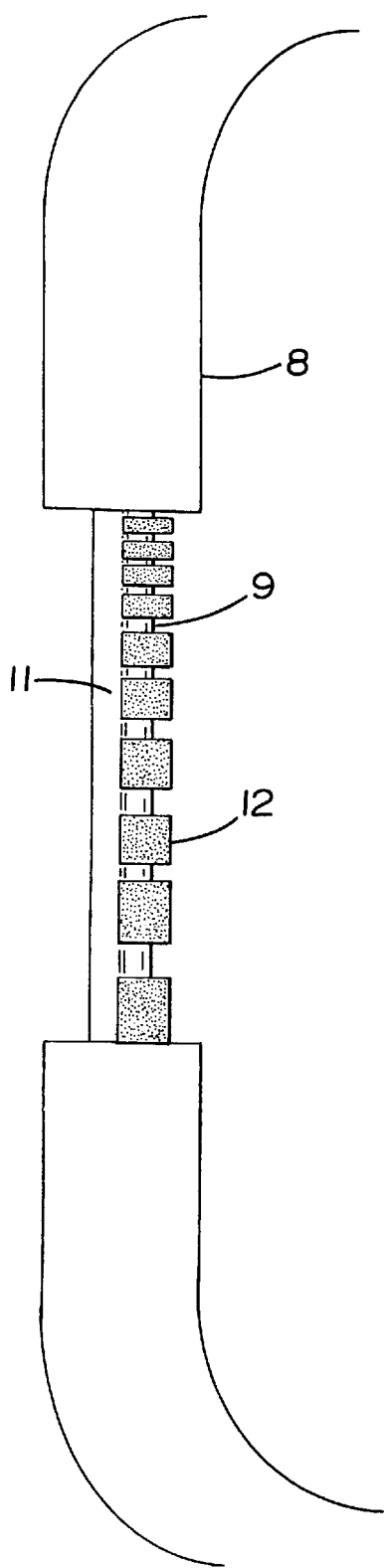
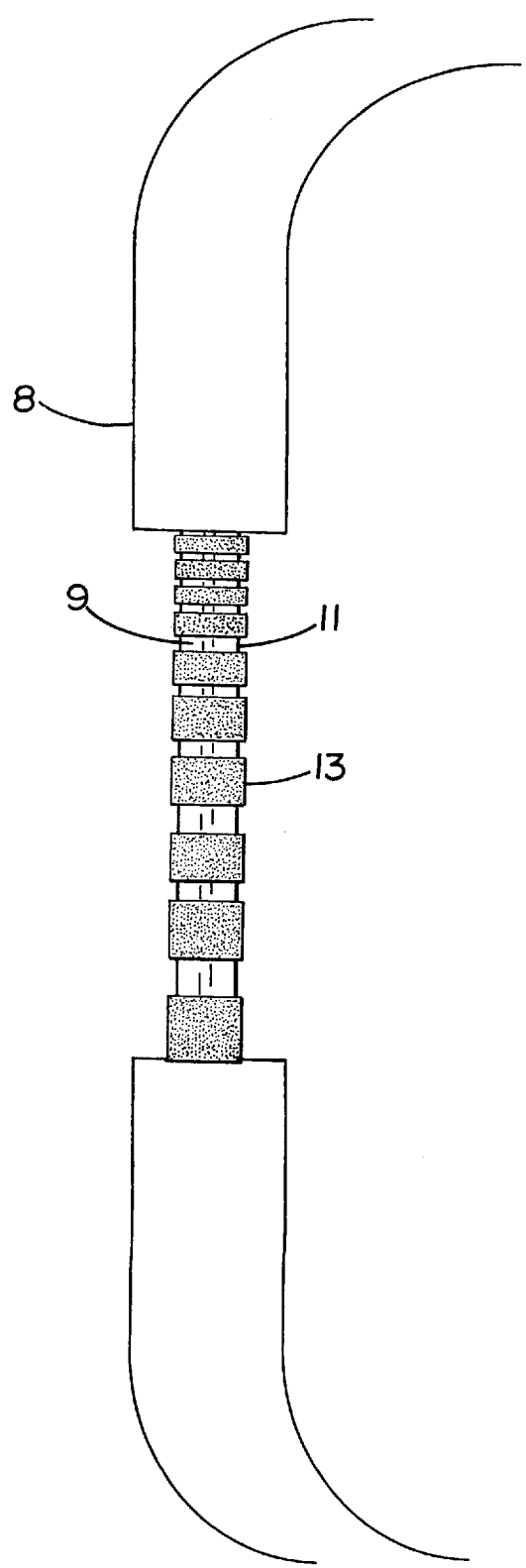

FIG. 14A
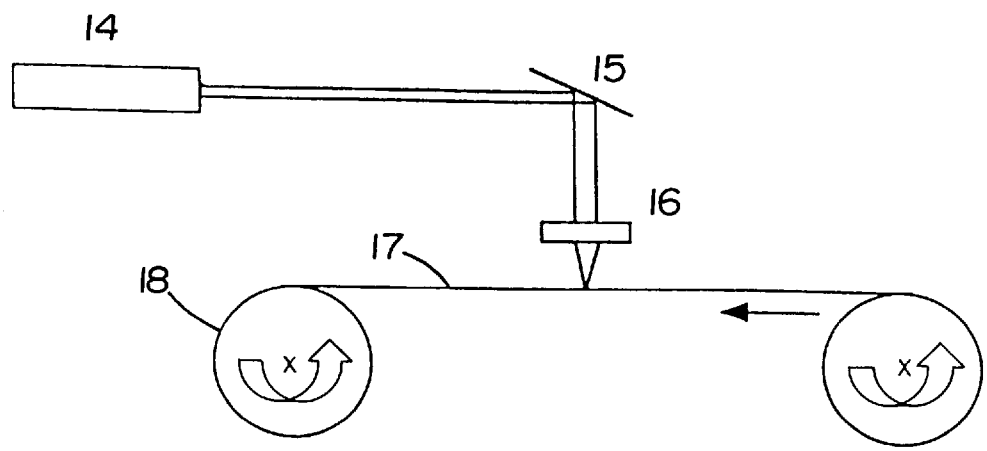
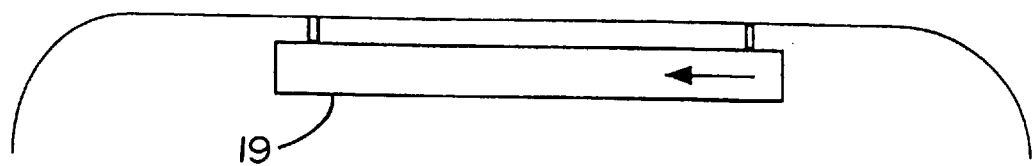
FIG. 14B

FIBER GRATING ENCODERS AND METHODS FOR FABRICATING THE SAME

This application claims benefit of Provisional Application Ser. No. 60/061,860, filed Oct. 15, 1997.

FIELD OF THE INVENTION

The Field of the present invention is relative and absolute position detection or movement detection devices (encoders). Linear, rotational, and conformal Fiber encoders with very long length or very big diameters are suggested. These devices use Fiber Gratings of different types to produce diffraction orders, which are detected and analyzed by light detector. A number of embodiments of Fiber Grating Encoders are suggested, such as one using Fiber Bragg Grating (FBG) with refractive index modulation, Surface Relief Fiber Gratings, and Amplitude (or Amplitude-Phase) Fiber Grating. Different embodiments can use Uniform or Chirped period size along the length of the Grating. Different embodiments can use transmission, reflection, or Bragg angle blaze reflection schemes.

BACKGROUND OF THE INVENTION

Most commercially available position encoders are based on glass scales which are transilluminated with an array of secondary gratings. The shadow of the gratings, forming Moiré effect is analyzed with photodiodes giving information about relative position. For example such an encoder [Model LS 106, J. Heidenhain GmbH, Traunreut, Germany] provides a resolution down to 0.5 mm. Many systems, like proposed by Ishizuka [U.S. Pat. No. 5,661,296] and Pettigrew [U.S. Pat. No. 4,776,701] involve separation of diffractive orders obtained from first diffraction grating which are then brought together and interfered giving fringe pattern which analyzed by photodetector. More advanced high resolution encoders, for example [Model L-104, Canon USa Inc., New York, N.Y. 11042], are based on the diffraction of an illuminating beam at a grating and detection of the interference pattern of selected diffraction orders. Position encoder of Remijan [U.S. Pat. No. 4,395,124] and [U.S. Pat. No. 4,542,989] detects a fringe pattern, created by diffraction of zero, plus first and minus first orders from phase diffraction grating. Light from He-Ne laser is collimated and focused at a focal point at a distance from grating. The spherical wave illuminates the grating, designed and fabricated to diffract equal intensity 0 and +/−1 orders. Zero order cone interferes with plus and minus cones separately giving fringe patterns. If the grating is moved in a plane that is perpendicular to the direction of the fringes, all the fringes appear to slide in the plane of photodetector, providing a possibility to encode a position. Mitchell [U.S. Pat. Nos. 5,486,923, 5,646,730, and 5,559,600] uses phase grating with minimized zero order. A poly-phase periodic detector is spaced close to the grating so that each detector phase or element responds principally to interference between the positive and negative first orders diffracted from the grating without intermediate reflection or magnification.

Three types of optical encoders, which use fibers, are known. The first type uses fibers only as a light delivery device. The advantage of using optical fibers in existing encoders was that fibers allow the electrical elements of the light source and decoding circuitry to be remotely located from the code plate. For example, Yeung [U.S. Pat. No. 4,767,164] disclosed rotational fiber optic encoder. The system utilizes optical fiber to transmit light to a pair of interrupter disks, and to collect light reflected from disks. Both disks are provided with alternating reflected and transmissive parts. Decoding circuitry is provided to convert the modulated component of the light signal to an electrical signal that represents the rotational speed of the wheel. Lenox [U.S. Pat. No. 4,240,066] described the cylindrical encoder for use with fiber optics, which contains of transmitting head of fibers, receiving head of fibers and code plate with windows that can slide between the heads. This enables the optical signals to be picked up reliably, but still requires bundle of individual fibers for transmitting head and bundle of fibers for receiving head, that makes system very complicated. Urbanik [U.S. Pat. No. 4,442,423] describes fiber optic position sensor, which employs 4 fibers for transmitting and 4 for receiving light passed through code plate with windows. Senuma [U.S. Pat. No. 5,498,867] suggested wavelength and time-division multiplexing to distribute light pulses to different collimators in encoder, and thus employ only one light source and one optical fiber. The limitation of position resolution (tens of micron) is due to code plate technique.

The second type of fiber encoders uses fibers for measuring strain in material. Zimmerman B. D et. al [U.S. Pat. No. 5,649,035] disclosed fiber optic sensor with the two reflective markers. This fiber is attached or embedded into the structure of material. An optical signal is input into the fiber and reflected at reflective markers at predetermined positions in the fiber. The time delay of the signals received back is analyzed to calculate strain in the structure. Bieren K. et al [U.S. Pat. No. 5,201,015] suggested conformal fiber optic strain sensor, where fiber is attached between two points of connection under tension. An interferometer is formed in the tensioned portion of the fiber. The sensor is mounted to a surface and changes in interference patterns output by the interferometer are monitored to measure strain in the surface.

The third type of fiber encoders, for example one has been disclosed by Udd E. et. al. [U.S. Pat. No. 5,397,891] uses fiber gratings to sense strain that can vary the spacing between the lines of the grating to vary center wavelength of the reflection or transmission spectra. Strain can also change the relative distance between two gratings written in one fiber, each at a different end, and thus change the resonance build up of light at certain wavelengths. The last approach was demonstrated by Glenn W. et. al. [U.S. Pat. No. 4,950,883].

All above-mentioned types of fiber encoders have a limitation of position encoding length.

At some extent more advanced approach has been chosen by Wanser [U.S. Pat. No. 5,661,246], which uses bending characteristics of fiber. His Fiber Optic Displacement sensor measures the distance between a fixed point and movable location using light loss characteristics of bent optical fiber. The sensor takes advantage of the specific shape that the fiber assumes upon changing the distance between the two attachment points. Reproducibility of this method requires well defined boundary conditions of the holders of the fibers. The effect is highly non-linear with the largest contributions in the regions of smallest bend radii and fastest change of bend radii. The sensitivity of this method is about 1 mdB/mm and since values like 10 mdB can be measured, position resolution of this method does not exceed 10 mm. Moreover, it is obvious, that this method will not work for very long length of fiber.

To date, all diffraction-based linear or rotational optical encoders have been made on flat plates (glass or other material) and thus:

1. Their sizes are limited by substrate size availability (maximum about 20").
2. The price of such substrates grows almost exponentially with their sizes.
3. The surface of the motion controlled elements (we don't consider strain control, but motion) has to be plane (non-conformal).

Few known optical encoders, based on flexible metal tapes, can't provide high positioning accuracy due to non-flat surface and strong temperature dependence.

SUMMARY OF THE INVENTION

In accordance with the present invention, for the first time a Fiber Grating is suggested as a diffractive element (scale) of optical encoder. Depending on the variety of proposed embodiments this Fiber Grating means:

1. Fiber Bragg Grating-phase grating-refractive index modulation grating encrypted in the core of the fiber;
2. Fiber Surface Relief Grating-phase grating, created
   on a layer of transparent material, deposited on the fiber jacket or cladding, or
   on fiber polymer jacket, or
   on fiber cladding layer, or
   on fiber core.
3. Fiber Amplitude or Amplitude-Phase Grating—Grating, made with opaque (metal) pattern layers on fiber jacket, fiber cladding layer, or fiber core surfaces.

All above listed Fiber Gratings may have Uniform or Chirped period. All above listed Fiber grating encoders can be implemented using transmission, reflection, or Bragg angle reflection schemes.

An object of the invention is to provide an encoder without reasonable limitation of its sizes.

Since Fiber, which is suggested to use as a substrate for diffractive element, is manufactured on continuous basis by drawing it from preform into multi-kilometer length wheels, there is no reasonable limitation of the length of linear fiber-based encoders. As soon as Fiber Grating can be mounted on circular symmetric figure with any large diameter, there is no limitation on the diameter of rotary encoder either.

A further object of the invention is to provide encoder for conformal parts motion control.

Since fiber can be mounted on figures, having arbitrary shape, it can be used for conformal parts motion control. Flexibility of fiber mounting can be used for design of an encoder for conformal type of motion.

A principal advantage of the invention is that cost of large size diffraction-based encoders can be significantly reduced.

Optical polished substrates cost grows almost exponentially with the area or length, whereas the cost of optical fiber (per linear unit) is constant or even decrease with the total length.

Other objects, features and advantages of the present invention will become apparent from the following detailed description of the preferred embodiments when taken in conjunction with the accompanying drawings.

BRIEF DESCRIPTION OF THE DRAWINGS

FIG. 1 is a schematic representation of the transmission mode Fiber Grating linear encoder, embodiment I;

FIGS. 3 and 3B are schematic representations of transmission mode Fiber Grating linear encoders, which use off-axis position of detector, embodiments III (3A) and IV (3B):

FIG. 6 is a schematic representation of Absolute position Fiber Grating encoder, which uses Bragg reflection scheme, embodiment VIII FIGS. 7A, 7B and 7C are schematic representations of Rotational Fiber Grating encoder: side view (7A) and top view (7B) and mounting option (7C)

FIGS. 8(A) and (B) are schematic representations of Conformal Fiber Grating encoders: rotational elliptical (8A) and translational/rotational conical (8B).

FIGS. 12A and 12B are schematic representations of Uniform (12A) Surface relief Fiber grating, one side patterned (12A) and entire surface patterned (12B);

FIGS. 13A and 13B are schematic representations of Chirped Surface relief Fiber grating, one side patterned (13A) and entire surface patterned (13B);

FIGS. 14A and 14B) are a representation of the optical configuration for the Surface relief Fiber Grating fabrication by laser ablation of fiber protective layer.

DETAILED DESCRIPTION OF THE PREFERRED EMBODIMENTS

The main idea of the present invention is to use Fiber Grating as a diffractive element for encoding a relative or absolute position. It gives a possibility of design and manufacturing very long length linear encoders or very big diameter rotational encoders, or arbitrary shaped encoders with complicated motion. Number of implementations of such an encoder can be used.

Linear Fiber Grating Encoders

FIG. 1 represents embodiment I, where laser 1 directs a spherical wave on a Fiber grating 3, mounted on a movable platform 4. The parameters of the grating is optimized for diffracting of 3 diffraction orders ("−1", "0", and "+1") with almost equal intensity. Moreover, diffraction angles are such that the zeroth order beam overlaps with both first and minus first order beams, while the first order beams don't touch each other. Diffraction fringes are produced in the areas of overlap. Detector 7 is positioned at least in one of the areas of overlap. If fiber is moved along its axis, fringes in the areas of overlap appear to slide through those areas. This fringe movement gives a position signal from the detector.

Figure 2:
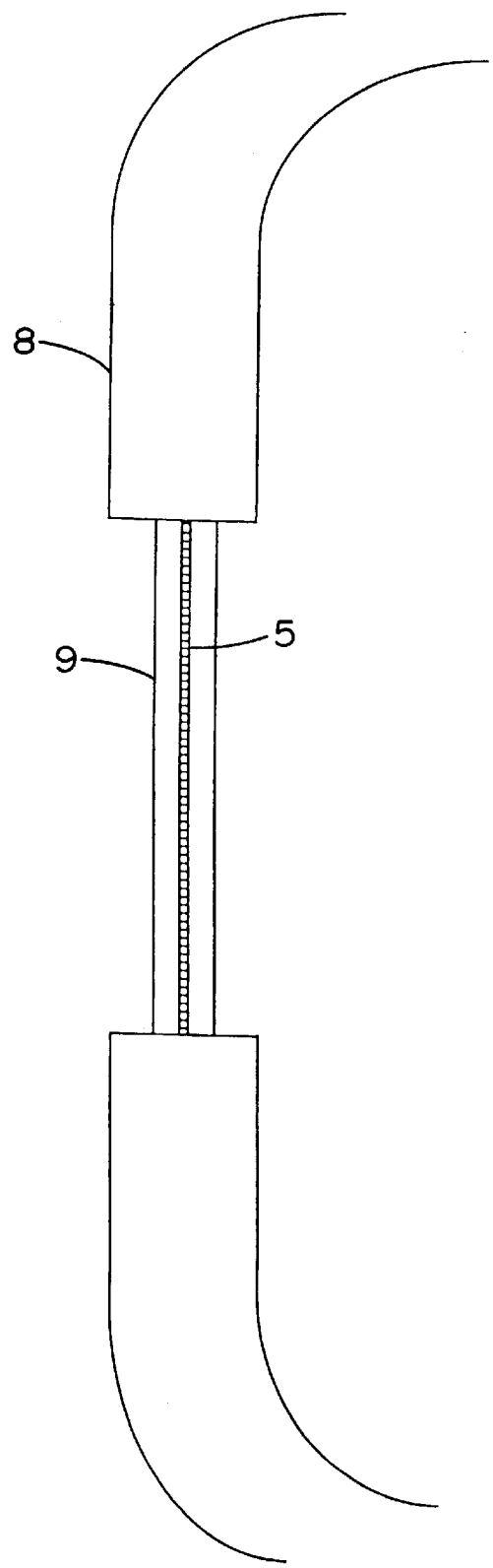
FIG. 2 is a schematic representation of the transmission mode Fiber Grating linear encoder, embodiment II.

FIG. 2 represents embodiment II, where fiber grating parameters are optimized for zeroth order suppression, and diffraction angles provide overlap between plus and minus first orders. The lens 2 focuses light on fiber grating. The light, scattered by the cylindrical surface of the fiber, is collimated on the fiber axis plane by the cylindrical lens 6.

The detector 7 is placed on the distance, where the natural interference fringe pattern is created, and detects fringe movement.

Cylindrical shape of the fiber cause light scattering to direction perpendicular to the surface of the fiber. As a result of this scattering long vertical strips of diffraction orders beams are created, as shown on FIGS. 3A and 3B. In the embodiments III and IV detector is positioned off-axis (relative to light source) and detects the interference fringe pattern, which is free from undiffracted light from light source.

Figure 4:
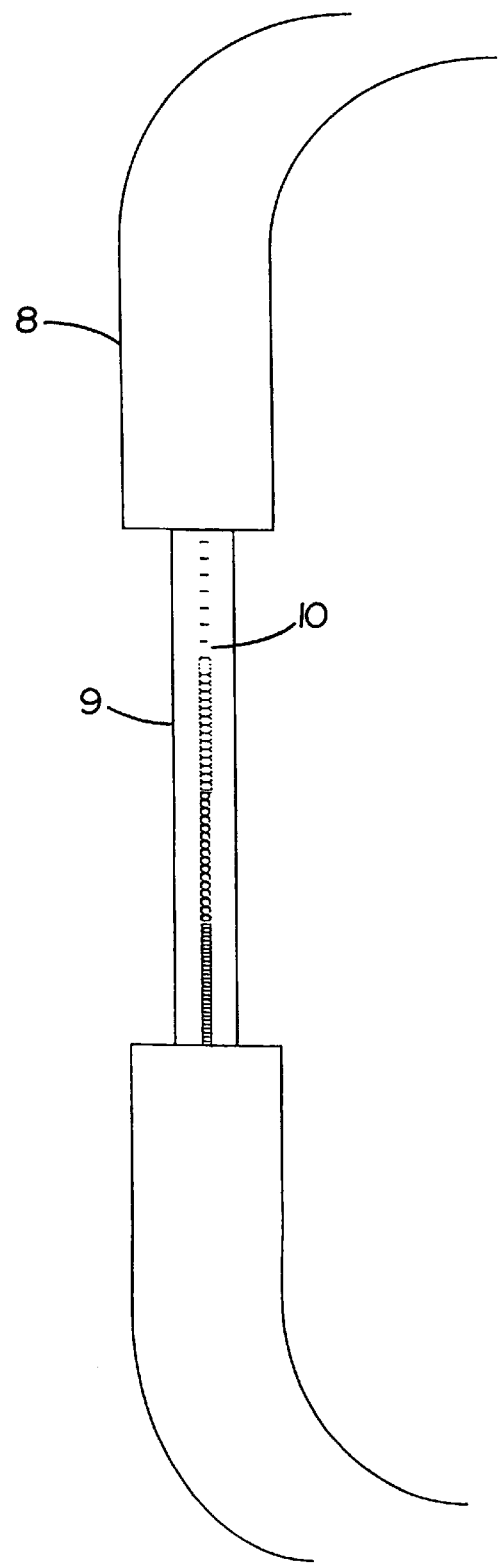
FIGS. 4A and 4B are schematic representations of the reflection mode Fiber Grating linear encoders with off-axis position of detector: embodiment V (4A) and VI (4B)

Embodiments V and VI use reflection scheme of the embodiments III and IV, as shown on FIGS. 4A and 4B, where detector and laser source are positioned on the one side of the fiber.

Figure 5:
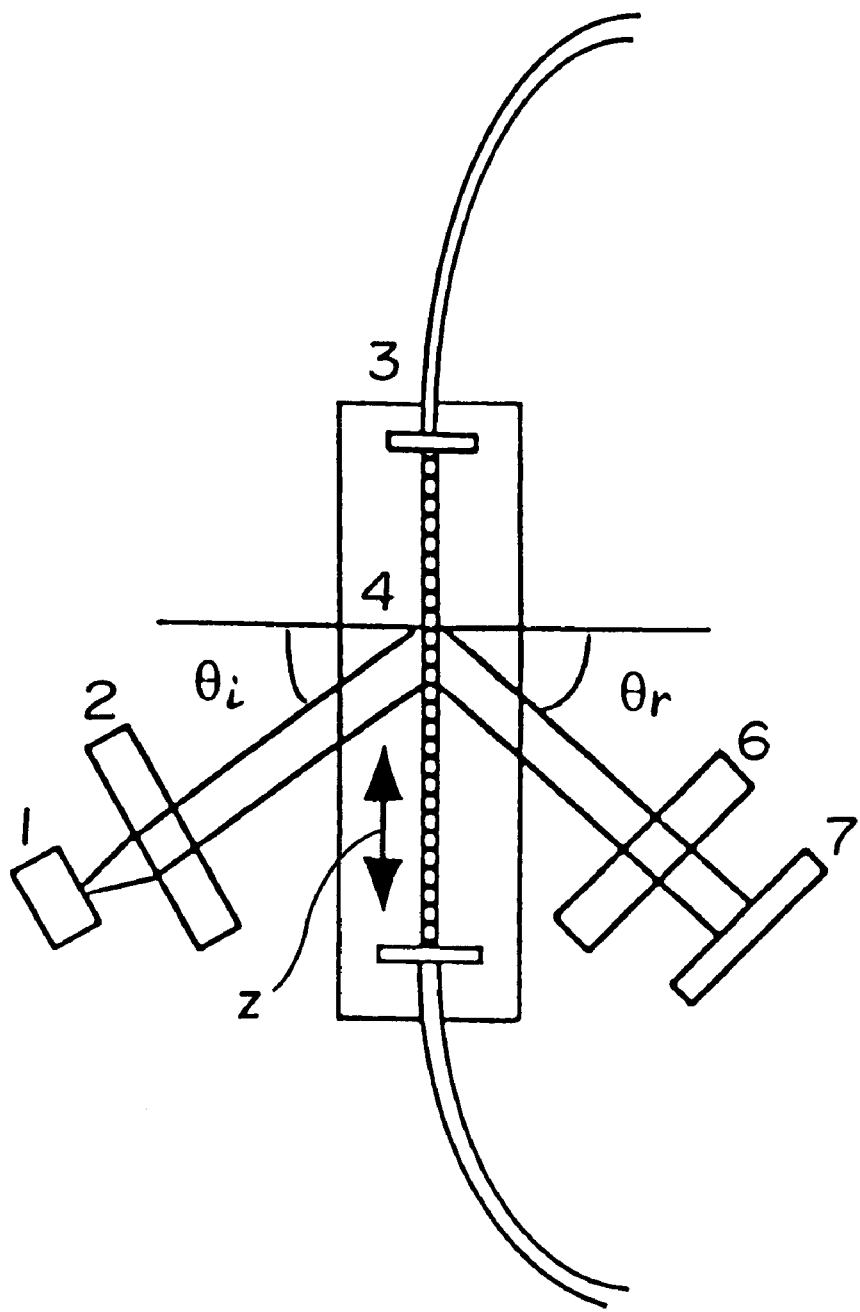
FIG. 5 is a schematic representation of Absolute position Fiber Grating encoder, which uses chirped fiber grating, embodiment VII.

The example of an absolute position fiber grating encoder, embodiment VII, presented on FIG. 5. Chirped fiber grating is manufactured, having period size, varying monotonically through the length of the grating. When the fiber moves, first order slides through the detector area giving an information about a position of the fiber.

Another example of absolute position fiber grating encoder, embodiment VIII, is given on FIG. 6. It uses a Bragg angle blazing from Chirped Fiber grating. The laser beam is directed at an incident angle $\theta_i$ onto the surface of the fiber. In the case of the first order Bragg reflection the transmitted and the reflected beams leave the fiber at the opposite sides of the fiber at equal angles $+/-\theta_r$. These angles are related to period size of the grating $P_0$ as follows:

$$\sin \theta_r = \sin \theta_i = \lambda/2P_0$$

When fiber moves period size of the illuminated part of the grating changes from $P_0$, thus first order Bragg reflection condition is destroyed and signal of the reflected light is dropped by a certain value, so absolute position of the fiber can be obtained using calibration curve.

Rotational Fiber Grating Encoders

FIGS. 7A and B represent an example of rotational fiber encoder, embodiment IX, where fiber (3) is coined around a transparent hollow cylinder (4), having a given diameter. The laser (1) is mounted inside a cylinder, detector (7), which is positioned outside a cylinder off-axis (FIG. 7B), detects interference fringes from "−1" and "+1" orders, or from "−1" and "0" orders, depending on optical scheme chosen.

Fiber can be spliced and attached to the part by stretching the two-part cylinder 40 with the treaded pin 41 (FIG. 7C).

The laser source can be mounted outside a solid or opaque cylinder, thus reflection mode should be implemented, embodiment X.

Conformal Motion Fiber Grating Encoders

The fiber can be mounted on any conformal surface and work as a conformal surface motion encoder. FIGS. 8A and 8B demonstrates two examples of conformal type fiber encoders, rotational elliptical (FIG. 8A), embodiment XI, and translational/rotational cone (FIG. 8B) encoder, embodiment XII. Both encoders shown having reflection mode scheme and off-axis detection position.

Flexibility of fiber allows design of encoder, which is capable to follow and detect any given way of motion. Part shown on FIG. 9A) performs a combination of linear translation and 360 degree rotation movements. Fiber is mounted on the part according to the trajectory of part's movement. Light beam is focused to the point of movement's junction. Splicing of pieces of fiber in that point give a reference for absolute movement detection.

Figure 9A:
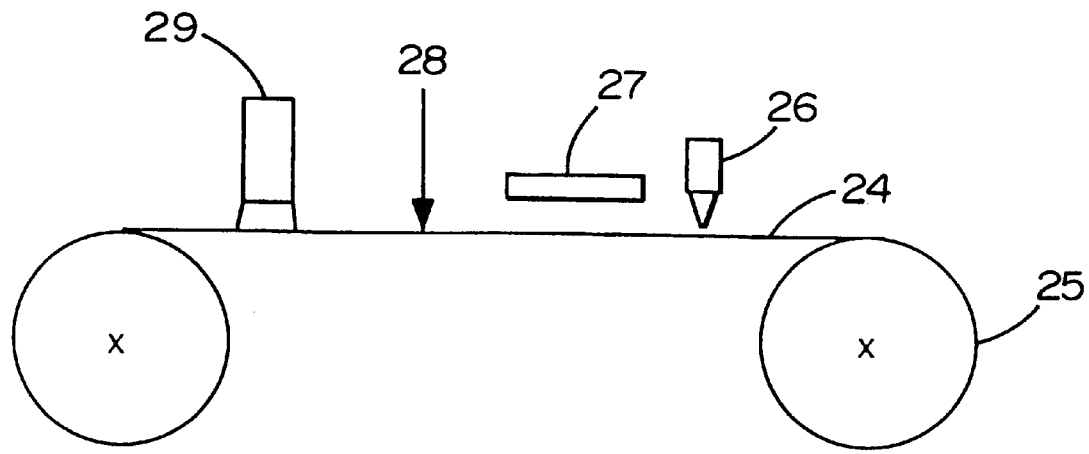
FIGS. 9(A) and (B) are schematic representations of Conformal Fiber Grating encoder (complicated motion).

Part shown on FIG. 9A) represents a Z-type of motion, that is a combination of linear motion and 180 degree rotation. Fiber is mounted on the surface of transparent movable plate.

Figure 9B:
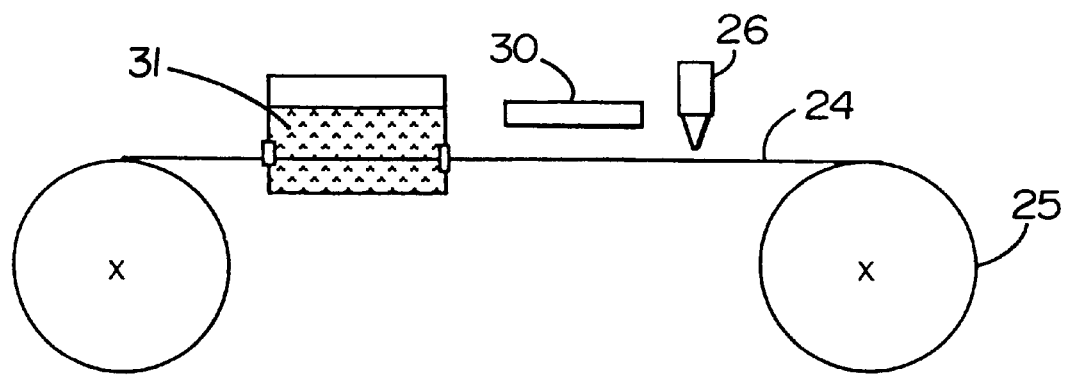

Part shown on FIG. 9B) performs a combination of linear translation and 360 degree rotation movements.

Linear Motion Fiber Encoder with Improved Positioning Accuracy

Figure 10A:
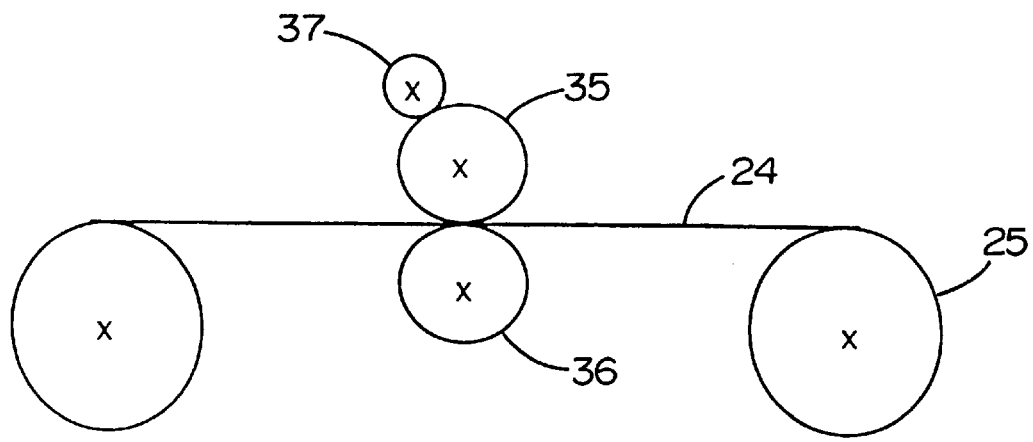
FIG. 10 is a schematic representation of Linear Fiber encoder with improved positioning accuracy.
Figure 10B:
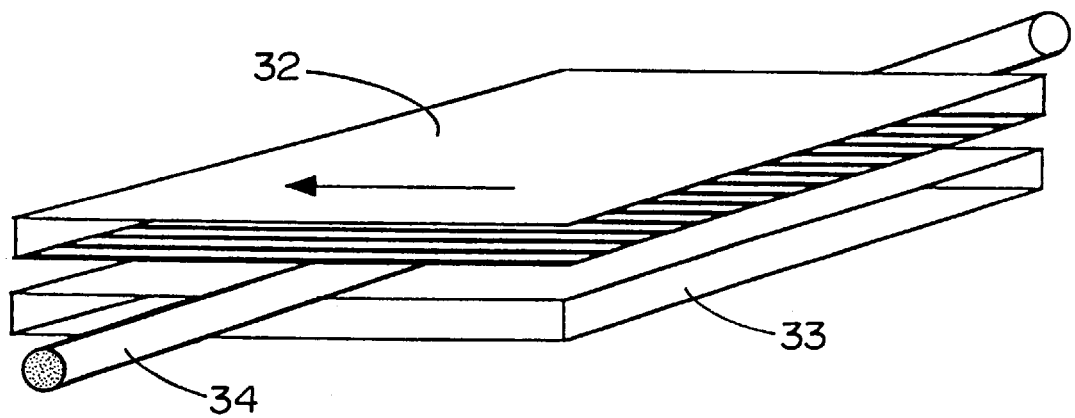

Fiber is coiled around cylinder, cylinder is translating and rotating along its axis (embodiment XIII presented on FIG. 10). This device is capable of translational movement detection with high accuracy. The accuracy is dependent on the pitch of fiber coiling around the cylinder (larger pitch, higher accuracy), and diameter of the cylinder (larger diameter, higher accuracy).

Fiber gratings for use in fiber encoders, described above, can be implemented in a form of Phase gratings—Fiber Bragg grating or Surface relief grating, or Amplitude gratings—thin film opaque layer on fiber surface.

Fiber Bragg Gratings for Optical Fiber Encoders

Figure 11A:
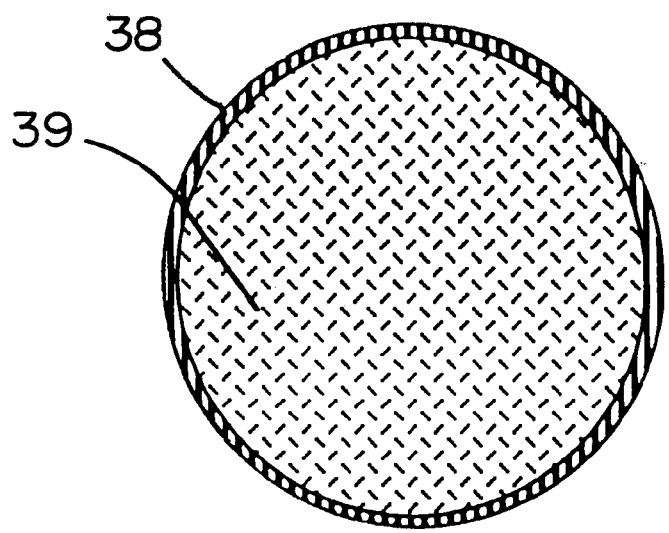
FIGS. 11A and 11B are schematic representations of Uniform (11A) and chirped (11B) Fiber Bragg grating structure
Figure 11B:
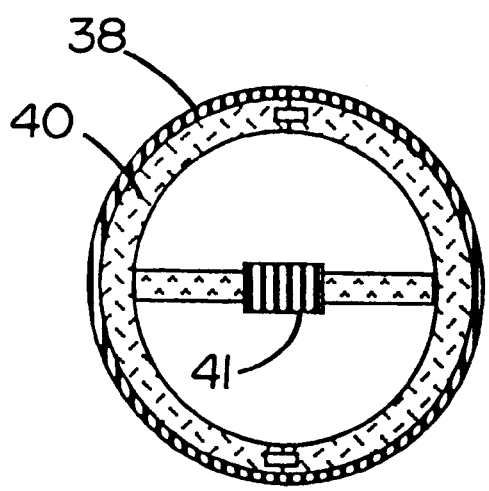
Figure 11C:
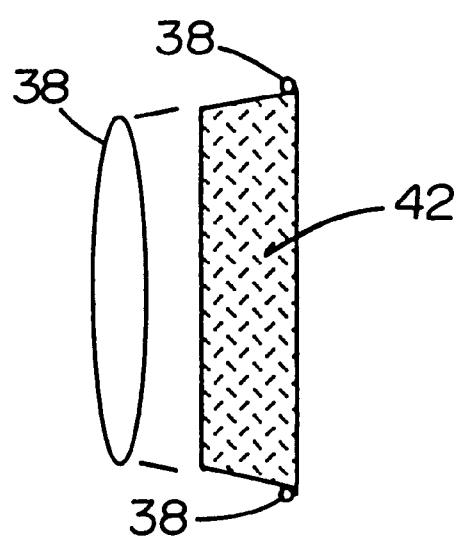

A drawing of a uniform and chirped Fiber Bragg Gratings are given on FIGS. 11A and 11B, accordingly, where 5 is a core, 9-cladding layer, and 8-polymer protective layer-jacket. Phase grating with refractive index modulation $\Delta n$ is written inside a core of the fiber.

Fabrication of fiber gratings is possible by few known techniques. One can use free-space holographic exposure [I Bennion et al. "UV-written in fibre Bragg Gratings", Tutorial Review, Optical and Quantum Electronics, 28, 93–135, 1996 and R. Kashyap "Photosensitive Optical Fibers: Devices and Applications" Optical Fiber Technology 1, 17–34, 1994]], prism-based interferometric exposure by method proposed by Kashyap [U.S. Pat. No. 5,384,884], or phase mask near field holography, proposed by Hill [U.S. Pat. No. 5,367,588] and Bruesselbach [U.S. Pat. No. 5,604,829]. Long Fiber grating can be written by few (or many) consecutive exposures with the fiber feeding system between these exposures (linear translation or wheel to wheel). Special attention has to be paid to stitching between the consecutive feeding steps. More suitable method for fabricating a very long Fiber Gratings is probably the point-by-point method. This method was demonstrated by Hill et al. [U.S. Pat. No. 5,104,209]. Fiber was exposed to the image of a slit produced by the excimer laser pulses, and the fiber was translated between pulses. Fiber Bragg Gratings 1.7 m long with period size of 155 $\mu$m have been written [U.S. Pat. No. 5,104,209]. Linewidths achievable by this method could be decreased further down to 1 $\mu$m. For better control of grating period one can use writing method with fiber translation with a constant speed, as described by Askins et al.[U.S. Pat. No. 5,400,422] and [C. G. Askins, et al. "Fiber Bragg reflectors prepared by a single excimer pulse", Optics Letters, 17(11), 833–835 (1992)] and Archambault et. al.[J. L. Archambault, et al. "High reflectivity and narrow bandwidth fibre gratings written by single excimer pulse", Electronics Letters, 29(1), 28–29 (1993)]. The last methods use so called Fiber Gratings Type-II fabrication by the single excimer pulse. The total exposure time is about 20 ns (the duration of the pulse). In this short time, a fiber feeding at speed 1 m/s is displaced by only 0.02 $\mu$m, which is small compared to a grating period. This technique allows writing Bragg Gratings in a fiber as it is being drawn from its preform, so it enables the fabrication of a fiber grating length in a kilometers range. Since the exposure technique proposed in U.S. Pat. No. 5,400,422 is the Free-space holographic, the drawback of this technique is that only Fiber grating with the length equal to interference pattern can be written on fiber.

From this point of view the best method could be a single pulse Type-II point-to-point technique with the constant speed fiber feeding as a method for writing a very long Fiber Bragg Gratings.

Among the advantages of this approach are as follows:
1. Better control of grating period: It is more easy to keep constant feeding speed than to get high accuracy of step-and-repeat positioning;
2. More robust gratings, which do not degrade at high temperatures [I Bennion et al. "UV-written in fibre Bragg Gratings", Tutorial Review, Optical and Quantum Electronics, 28, 93–135, 1996 and R. Kashyap "Photosensitive Optical Fibers: Devices and Applications" Optical Fiber Technology 1, 17–34, 1994]]. It is due to the fact that Type II gratings, produced by single excimer pulse, are the result of physical damage onto the core of the fiber, that is permanent. Contrary, Type I gratings produced by low power multi-shot holographic exposure, have been shown to decay being exposed to elevated temperatures [I Bennion et al. "UV-written in fibre Bragg Gratings", Tutorial Review, Optical and Quantum Electronics, 28, 93–135, 1996 and R. Kashyap "Photosensitive Optical Fibers: Devices and Applications" Optical Fiber Technology 1, 17–34, 1994]]

In order to get a high contrast interference fringe pattern grating should be written with the sufficient refractive index modulation. For the special optical communication fibers with core codoped with boron and $GeO_2$ the values $\Delta n$ up to $7 \times 10-4$ were achieved. I. Bennion et al. [I. Bennion et al. "UV-written in fibre Bragg Gratings", Tutorial Review, Optical and Quantum Electronics, 28, 93–135, 1996] describes a very effective method of sensitization of fibers by soaking it in high-pressure hydrogen in the range of 20–750 atm at a temperatures in the range 20–75° C. for a period of several days. The values of $\Delta n$ easily exceeding 0.01 have been reported so far. So the fibers for Fiber Bragg encoders should be hydrogen sensitized before writing a grating in it.

The high contrast of the interference fringes, which is necessary for optical encoder of embodiment II, can be achieved when zero order is suppressed efficiently. For Zero order suppression the phase grating has to be written with the optical path differences of $\lambda/2$, which for the diode laser source of 0.78 $\mu$m gives the value 0.36 $\mu$m. This optical path difference can be created by writing a Fiber Bragg grating with index of refraction modulation of 0.01 within a core diameter of 36 $\mu$m.

In reflection type encoder, embodiment V, optical path difference of $\lambda/4$ has to be obtained for zero order suppression. It means $\lambda/4=0.18$ $\mu$m for 0.78 $\mu$m laser source wavelength. Such an OPD can be obtained with the index of refraction modulation of 0.01, written in a core of 18 $\mu$m diameter.

Chirped Fiber Bragg Grating

Chirped Fiber Bragg gratings can be manufactured by certain adjustments of holographic set-up as per Macomber [U.S. Pat. No. 5,238,531]. Limitation of length of the grating (less than 150 mm) is reported.

Alternatively, chirped Bragg grating can be written with phase mask scheme as per Chesnoy, et al. [U.S. Pat. No. 5,655,040]. Interference fringe pattern, created by diffraction of laser beam on phase mask, is delivered to fiber by optical system with variable focal length. Changing a focal length of the system cause chirp in Bragg grating period size. Mizrahi et. al. [U.S. Pat. No. 5,636,304] describes a method of fabrication a chirp by changing a wavelength of the laser during a writing process with phase mask or holographic. The chirped grating length is limited by the length of the phase mask or holographic interference pattern. Epworth R. E. et al [U.S. Pat. No. 5,602,949] suggested a method of chirped grating fabrication based on applying a non-uniform strain on uniformly written fiber grating, which changes the period of grating locally.

All above-mentioned methods of fabricating a chirped fiber grating can not help with manufacturing a very long fiber grating. It can be done by changing a fiber feed rate gradually during a single exposure, point-to-point writing.

Surface Relief Gratings for Optical Fiber Encoders

Surface relief uniform and chirped Fiber gratings are presented in FIGS. 12A, 12B, 13A and 13B. One side patterning or entire fiber cylindrical surface patterning can be fabricated.

Surface relief Fiber Grating can be manufactured by few different ways:
  Phase surface relief fiber grating can be created by applying organic layer on the surface of the fiber and patterning it; such an organic layer might be photoresist or polyimide.
  Phase surface relief fiber grating can be created on cladding layer of the fiber by etching, using patterned organic layer photoresist on the top, as a mask.
  Etching can be continued until core appears, thus phase surface relief grating on core can be created.
  Amplitude surface fiber grating can be created by applying metal or other opaque layer on top of fiber surface, then patterning it with lithographic techniques.

Some holographic methods [U.S. Pat. No. 4,842,405] of Fiber surface relief gratings manufacturing are published. Limitation of the length of such a grating is obvious due to holographic type of exposure.

El-Sherif et al. [U.S. Pat. No. 4,842,405] published the method of etching surface relief grating into the core of the fiber for optical communication applications.

I suggest three different methods for Surface Fiber grating fabrication.

The first method (FIGS. 14A and 14B) uses ablation of existing polymer jacket in order to form protective mask for further wet or dry etching into the cladding. A beam of Excimer laser 14 is reflected by mirror 15 and focused by cylindrical lens 16 on fiber 17. Fiber is feeding with the constant or variable speed by means of synchronized rotational system 18 (wheel to wheel scheme) or high quality translational system 19. Excimer pulse energy is chosen above ablation threshold for fiber jacket material. The result is the fiber, patterned with polymer jacket grating. Then the grating is etched into the cladding layer or core through the polymer jacket mask pattern by means of wet chemical etching or plasma etching. Finally, the jacket layer is stripped in a chemical stripper or in an oxygen plasma asher.

The method of fabricating Surface Fiber Chirped grating is similar to the uniform, but the fiber feeding speed in varied gradually from the one end of the fiber to another. One can manufacture very long (length is limited to capacity of the wheel) gratings with explained method.

The second proposed method for Surface Relief Grating fabrication (FIGS. 15A and 15B) uses ink jet printing technique. Description of this technique can be find in application to microelectronics circuit fabrication, Drummond et al. [U.S. Pat. No. 5,132,248] and to printing plates fabrication, Gerber et al. [U.S. Pat. No. 5,495,803]. In the first method the material is deposited by providing a colloidal suspension of the material and directly writing the suspension onto the substrate surface using orifice printhead and piezoelectric driven jet system. Following the printing step, the deposited material is dried by lamps and thermally, preferably laser, annealed. Then excess material can be removed from the substrate by washing. The process is suitable for depositing any material which can be formed as a colloid either mechanically or chemically. Thus, pure metals, such as Au, Cu, Pt, and Ag, as well as refractory metals, such as W, Ta, Mo or SiC can be deposited by this method.

The width of the resulted lines in the pattern can be varied by varying particle size of the colloidal suspension, orifice size of the ink jet printing nozzle, as well as laser annealing step (laser focusing and energy level). Combination of such ink jet printing with laser annealing technique gives a possibility to obtain high resolution structures, down to submicron sizes.

According to another modification of ink-jet printing technique [U.S. Pat. No. 5,132,248] ink jet print head deposits ink onto a substrate covered by photosensitive emulsion. Then emulsion is exposed through the ink mask and developed in developer.

Figure 15A:
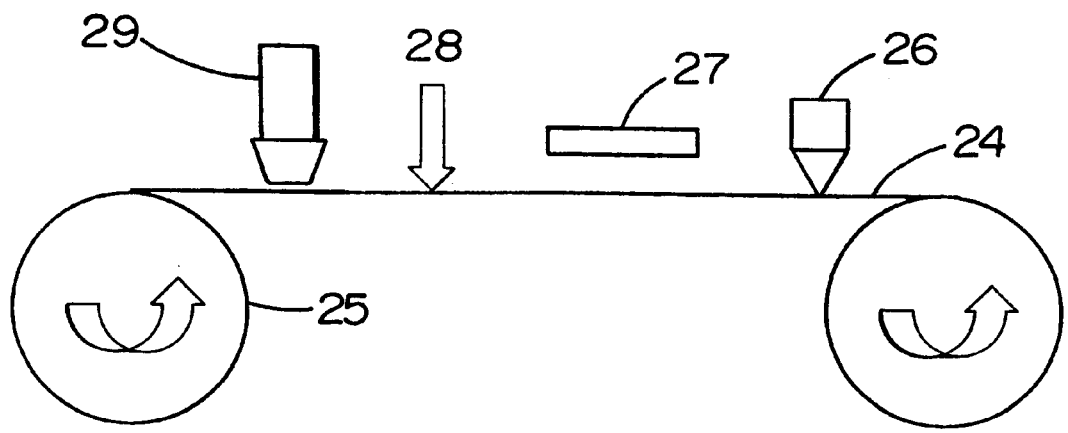
FIGS. 15A and 15B are a representions of the two ink-jet surface relief fiber grating fabrication methods.
Figure 15B:
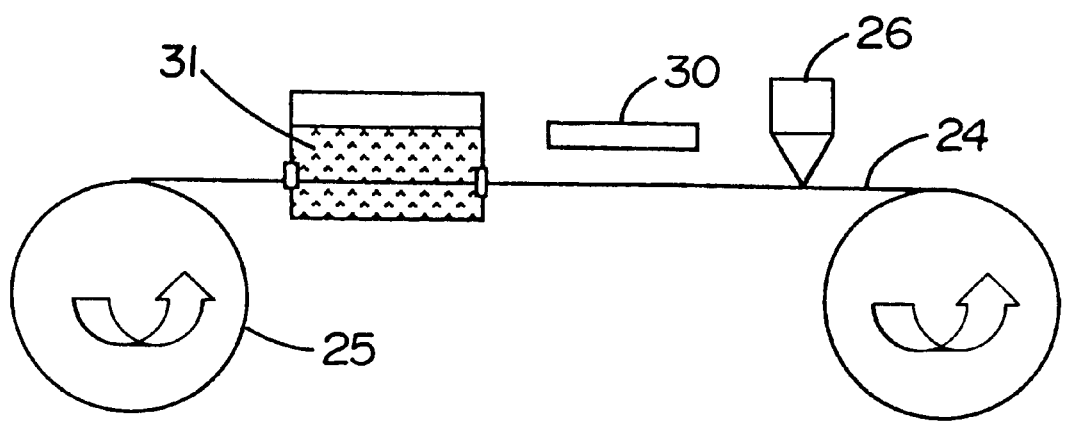

For the fabrication of grating on the fiber surface we can modify the above-mentioned methods (FIGS. 15A and 15B). According to the first modification (FIG. 15a)) fiber 24 without protective layer is drawn by the rotational or linear translational system (shown rotational one) 25 with a constant or variable speed, ink jet head 26 deposits metal colloidal solution onto fiber surface. Lamp 27 is drying the layer. The laser beam 28 is annealing the lines for defining the grating structure and water spray gun 29 washes fiber from residual colloid material. Then the fiber is etched in HF solution or in Plasma Etching system.

According to the second modification (FIG. 15B) fiber 24 without a protective layer, is coated with photoresist and soft baked. Then it is drawn by the rotational or linear translational system 25 (shown rotational one) with the constant speed, ink jet head 26 deposits ink onto the photoresist layer. UV lamp 30 exposes photoresist through ink mask, then photoresist is developed in developer solution 31. Finally the fiber is etched in HF solution or in Plasma Etching system.

The print head use hot melt ink. A number of hot melt inks are known. Such inks are solid at room temperature and are liquefied by heating to about 50° C. Inks of this type are described in U.S. Pat. 5,053,079.

Figure 16A:
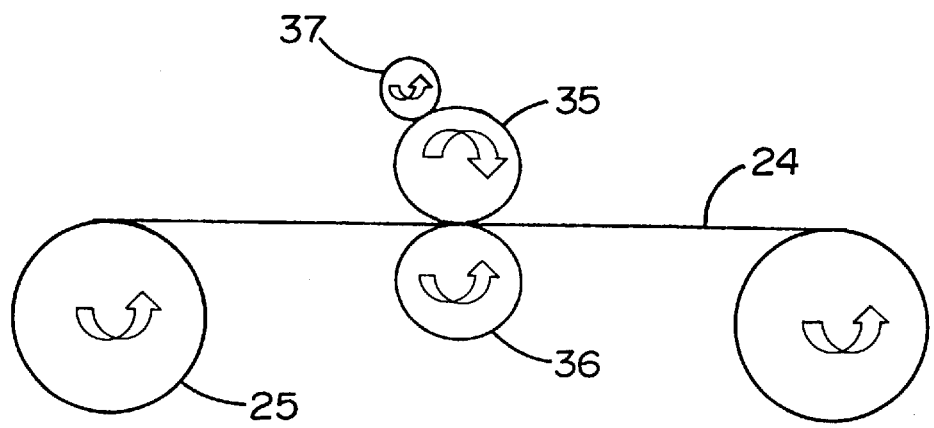
FIGS. 16A and 16B are representations of the two micro-contact lithography techniques for fabrication of surface relief fiber gratings
Figure 16B:
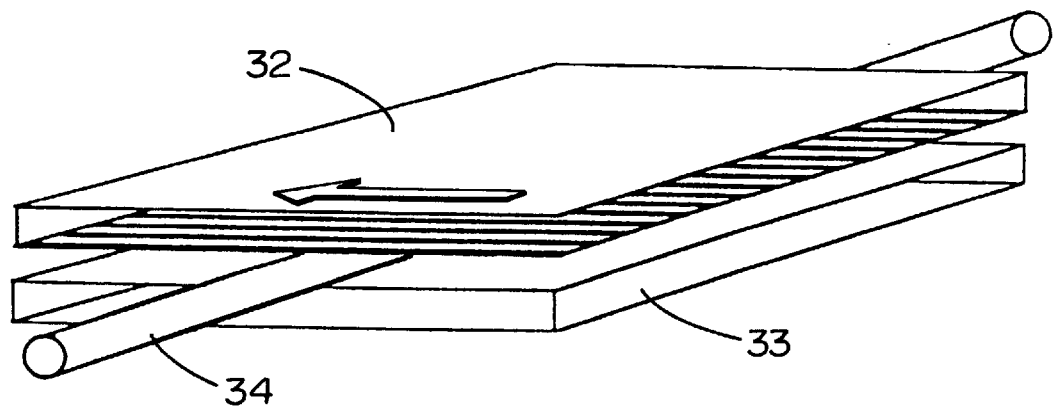

The third proposed method for Surface Relief Grating fabrication (FIGS. 16A and 16B) uses microcontact printing technique. The description of this technique one can find in [Rogers J. et al. "Using microcontact printing to generate amplitude photomask on the surface of optical fibers: A method for producing in-fiber gratings", Appl. Phys. Lett., 70(1), Jan. 6, 1997] and U.S. Pat. 4,454,810]. The patent [U.S. Pat. No. 4,454,810] describes the intaglio printing apparatus, which includes plate cylinder, an impression cylinder adapted to be periodically pressed against the press cylinder for transferring rotation, an inking rollers in contact with the surface of plate. The impression cylinder is moved intermittently toward the printing plate to urge sheet material into contact therewith. The microcontact printing technique has been already used for lithography onto fiber surface [Rogers J. et al. "Using microcontact printing to generate amplitude photomask on the surface of optical fibers: A method for producing in-fiber gratings", Appl. Phys. Lett., 70(1), Jan. 6, 1997]. The explained method (FIG. 16b) consists of fabrication elastomeric stamp 32 using photolithographic or other means. This stamp is inked with palladium colloids, and an optical fiber 34 stripped of its protective polymeric jacket is rolled over the stamp being pressed by support 34. Contact of the fiber with the raised regions of the stamp transferred colloids to the fiber. Conformal contact of the elastomeric stamp with the substrate allows the formation of patterns on curved surface of the fiber. Patterns with feature sizes in the micron range can be formed on substrates with radii of curvature as small as 25 μm. Unfortunately, it is hard to get very long fiber grating using this method.

I propose the modification of the first method for fabrication of surface relief gratings on fibers.

This modification (FIG. 16A) uses translational system 25 which moves fiber 24, which is pressed against the rolling roll 35 by impression cylinder 36. The rolling roll stamp 35 is in rotational contact with the ink wetted cylinder 37. The grating relief in rolling roll stamp is made by photolitography or other methods (ruling, ablation, etc.). The ink mask on the fiber can be further used as a mask for metal layer deposition in order to form amplitude fiber grating, or for the subsequent wet or dry etch of cladding layer through the metal mask in order to form phase grating.

The foregoing description of the preferred embodiments of the present invention have been presented for purposes of illustration and description. It is not intended to be exhaustive or to limit the invention to the precise form disclosed, and many modifications and variations are possible in light of the above teachings. The preferred embodiments were chosen and described in order to best explain the principles of the invention and its practical applications to thereby enable others skilled in the art to best utilize the invention and various embodiments and with various modifications as are suited to the particular use contemplated. It is intended that the scope of the invention be defined only by the claims appended hereto.

What is claimed is:

1. A position encoder comprising a fiber having a diffraction fiber grating for encoding a relative or absolute position.

2. The position encoder of claim 1 wherein the fiber has a generally circular cross-section and a length.

3. The position encoder of claim 1 wherein the fiber has a rectangular cross section and length.

4. The position encoder of claim 1 wherein the fiber comprises a core, cladding layer, and jacket layer.

5. The position encoder of claim 1 wherein the fiber is flexible.

6. The position encoder of claim 5 wherein the fiber grating is defined by periodic modulation of optical path length.

7. The position encoder of claim 6 wherein the diffraction fiber grating is defined by periodic refractive index modulation of the fiber material along fiber axis (Fiber Bragg grating).

8. The position encoder of claim 6 wherein the diffraction fiber grating is defined by periodic surface relief along fiber axis.

9. The position encoder of claim 6 wherein the grating is fabricated on a transparent layer, deposited on fiber surface.

10. The position encoder of claim 6 wherein the grating is represented by alternating of transparent and opaque regions on fiber surface.

11. The position encoder of claim 6 wherein the grating is fabricated on the jacket layer.

12. The position encoder of claim 6 wherein the grating is fabricated on the cladding layer.

13. The position encoder of claim 6 wherein the grating is fabricated on the core of the fiber.

14. The position encoder of claim 6 further comprising a light source, which directs the light to the fiber from the side.

15. A position encoder comprising a fiber having a diffraction fiber grating for encoding a relative or absolute position; and a movable carrier, wherein the fiber is fixed onto the carrier.

16. The position encoder of claim 15 further comprising a detector placed relative to fiber where interference fringe pattern is created, wherein a shifting fringe pattern in a plane of the detector enables an analyzing mode of the detector for providing information about relative movement between the fiber and the detector.

17. The position encoder of claim 15 further comprising a light source and a lens for focusing light from the light source onto the fiber grating.

18. The position encoder of claim 15 further comprising a cylindrical lens for collecting diffracted light onto a plane parallel to the fiber axis.

19. The position encoder of claim 16 further comprising a light source and wherein the detector is placed on an opposite side of the fiber than the light source, and wherein light from the light source shines through the fiber to the detector.

20. The position encoder of claim 16 further comprising a light source and wherein the detector is placed on the same side of the fiber as the light source, and wherein light from the light source is reflected by the fiber to the detector.

21. The position encoder of claim 16 wherein the detector is placed off-axis of a light source beam.

22. A position encoder comprising a fiber having a diffraction fiber grating for encoding a relative or absolute position wherein the grating on the fiber is defined by periodic modulation of the path length and has a uniform period size.

23. A position encoder comprising a fiber having a diffraction fiber grating for encoding a relative or absolute position wherein the grating on the fiber is defined by periodic modulation of the path length and has a chirped period size.

24. The position encoder of claim 15 further comprising a detector for detection of one or few diffraction orders, but not "0", wherein shifting of this order in a plane of the detector enables an analyzing mode of the detector for providing information about absolute movement between the fiber and the detector; and further comprising two lenses for focusing light onto the fiber and the detector.

25. The position encoder of claim 15 further comprising a light source, which directs light beam at an incident angle onto the surface of the fiber, the incident angle is not equal to 0 degree; and further comprising a detector, the detector is provided for detection of light reflected from fiber by an angle, which is equal to angle of incidence; and further comprising two lenses for focusing light onto fiber and detector; wherein variation of detected light intensity enables an analyzing mode of the detector for providing information about absolute movement between the fiber and the detector.

26. The position encoder of claim 15 wherein the fiber is attached to a perimeter of a cylinder to form a rotational encoder, the cylinder forming a part of the movable carrier.

27. The position encoder of claim 26 wherein the cylinder comprises a first half, and a threaded pin connecting the first half to the second half, wherein the fiber is attached to the cylinder in an unstretched mode and wherein, subsequent attachment, the fiber and the cylinder can be stretched by rotating the threaded pin to reach a stretched mode.

28. The position encoder of the claim 26 wherein a first and second end of the fiber are spliced together without loss of position accuracy for relative position encoder.

29. The position encoder of the claim 26 wherein a first and second end of the fiber are spliced together and stitching point is used as a reference position for absolute position encoder.

30. The position encoder of claim 15 wherein the fiber is attached to a surface of a part having arbitrary shape to form a conformal surface encoder, the conformal surface forming a part of the movable carrier.

31. The position encoder of claim 30 wherein the surface includes a cone part and wherein the fiber is coined upon the cone part with a certain pitch to form a cone translational/rotational movement encoder, the cone part being a part of the movable carrier.

32. The position encoder of claim 30 further comprising a light source and detector, wherein the part having arbitrary shape is transparent to light from the light source, and wherein the light source and the detector are placed on other sides of the fiber, attached to the part.

33. The position encoder of claim 30 further comprising a light source and detector, wherein the part having arbitrary shape is a solid block, and light source and detector are placed on one side of the fiber.

34. The position encoder of claim 16 wherein the movable carrier, and fiber attached to it, undergoes a motion, which is represents a combination of linear motion (translation) and rotational motion.

35. A method of encoding a relative or absolute position comprising
providing a light source;
providing a fiber;
providing a grating on the fiber;
fixing the fiber on a movable carrier;
directing light from the light source towards the grating on the fiber;
placing a detector relative to the fiber where non-zeroth diffraction order or fringe pattern is created;
detecting movement of the fringe pattern with the detector, and
providing information about a change in position of the fiber.

36. The method of claim 35 wherein the step of fixing the fiber on a movable carrier includes stretching fiber between two posts, mounted on the carrier, and fixing the fiber to these posts permanently.

37. The method of claim 35 wherein the step of providing a grating on a fiber includes exposing the fiber to an image of a narrow slit produced by excimer laser pulse, and translating the fiber against laser beam.

38. The method of claim 37 wherein the fiber translation speed is monotonically changed between each consecutive laser pulse in order to create chirped fiber grating.

39. The method of claim 35 wherein the step of providing a grating on the fiber includes stripping fiber jacket in chemical acid or oxygen plasma ashing, coating the fiber with photoresist layer, exposing photoresist layer through photomask, containing grating pattern, developing photoresist in developer, etching profile to cladding layer of the fiber in acid, and finally stripping photoresist layer.

40. The method of claim 35 wherein the step of providing a grating on a fiber includes depositing a metal layer on surface of the fiber, depositing of photoresist layer on top of the metal layer, exposing photoresist layer through photomask containing grating pattern, developing photoresist, etching the metal layer in acid or plasma etching process, and finally stripping photoresist layer.

41. The method of claim 35 wherein the step of providing a grating on the fiber includes printing the grating onto the fiber.

42. The method of claim 41 wherein the step of printing on the fiber is done by ink jet technique.

43. The method of printing a grating or other arbitrary surface relief structure on fiber comprising
   providing a cylinder having a certain surface relief ruled mechanically or through laser ablation on the surface parallel to the cylinder axis,
   rolling the cylinder over the fiber along fiber length;
   providing another cylinder wetted with deposition material wherein the cylinders are rolling from opposite sides of the fiber.

44. The method of claim 43 wherein fiber is printed from two sides simultaneously, further comprising the step of providing two identical cylinders with grooves and aligning the two identical cylinders to each other to provide a grating to two sides of the fiber.

45. The method of claim 43 further comprising the step of selecting a soft material to form the cylinders.

46. The method of claim 43 wherein the cylinder is made from metal, further comprising the step of heating the cylinder and rolling the cylinder over the fiber having fiber jacket and pressing the cylinder against the fiber jacket while rolling (fiber grating embossing).

* * * * *